United States Patent [19]

Leaton

[11] Patent Number: 5,305,867
[45] Date of Patent: Apr. 26, 1994

[54] METHOD AND APPARATUS FOR FEEDING ARTICLES

[75] Inventor: Timothy H. Leaton, Ascot, Great Britain

[73] Assignee: Gersan Establishment, Liechtenstein

[21] Appl. No.: 969,266

[22] PCT Filed: Jul. 11, 1991

[86] PCT No.: PCT/GB91/01144
§ 371 Date: Feb. 24, 1993
§ 102(e) Date: Feb. 24, 1993

[87] PCT Pub. No.: WO92/00907
PCT Pub. Date: Jan. 23, 1992

[30] Foreign Application Priority Data

Jul. 11, 1990 [GB] United Kingdom ............... 9015245

[51] Int. Cl.⁵ .............................................. B65G 47/24
[52] U.S. Cl. .................................. 198/377; 198/793; 198/803.16
[58] Field of Search ........... 198/375, 377, 793, 803.16, 198/803.14, 460

[56] References Cited

U.S. PATENT DOCUMENTS 2,205,178 6/1940 Schreiber .
3,231,061 6/1966 Borkmann .
4,131,192 12/1978 Cipolla .............................. 198/460

FOREIGN PATENT DOCUMENTS 2300725 9/1976 France .
2167197A 5/1986 United Kingdom .

Primary Examiner—D. Glenn Dayoan
Attorney, Agent, or Firm—Rosen, Dainow & Jacobs

[57] ABSTRACT

A feeding apparatus includes an upper movable carrier (1) having a plurality of guides or receptacles (7) which are transported at a predetermined speed and with a predetermined spacing along a predetermined path. The guides each have an open bottom and are each adapted to receive articles which are individually fed thereto. Over a first portion of its path, each guide (7) lies immediately above a lower carrier (11) which closes the bottom of and moves in synchronism with the guide (7), so as to allow one of the articles to become held within the guide (7) by the lower carrier (11) for a sufficient period of time as to allow the article to settle. Over a subsequent portion of the path, the guide (7) and the lower carrier (11) are separated from one another, thereby exposing the article on the lower carrier with accurately defined position and timing.

22 Claims, 2 Drawing Sheets

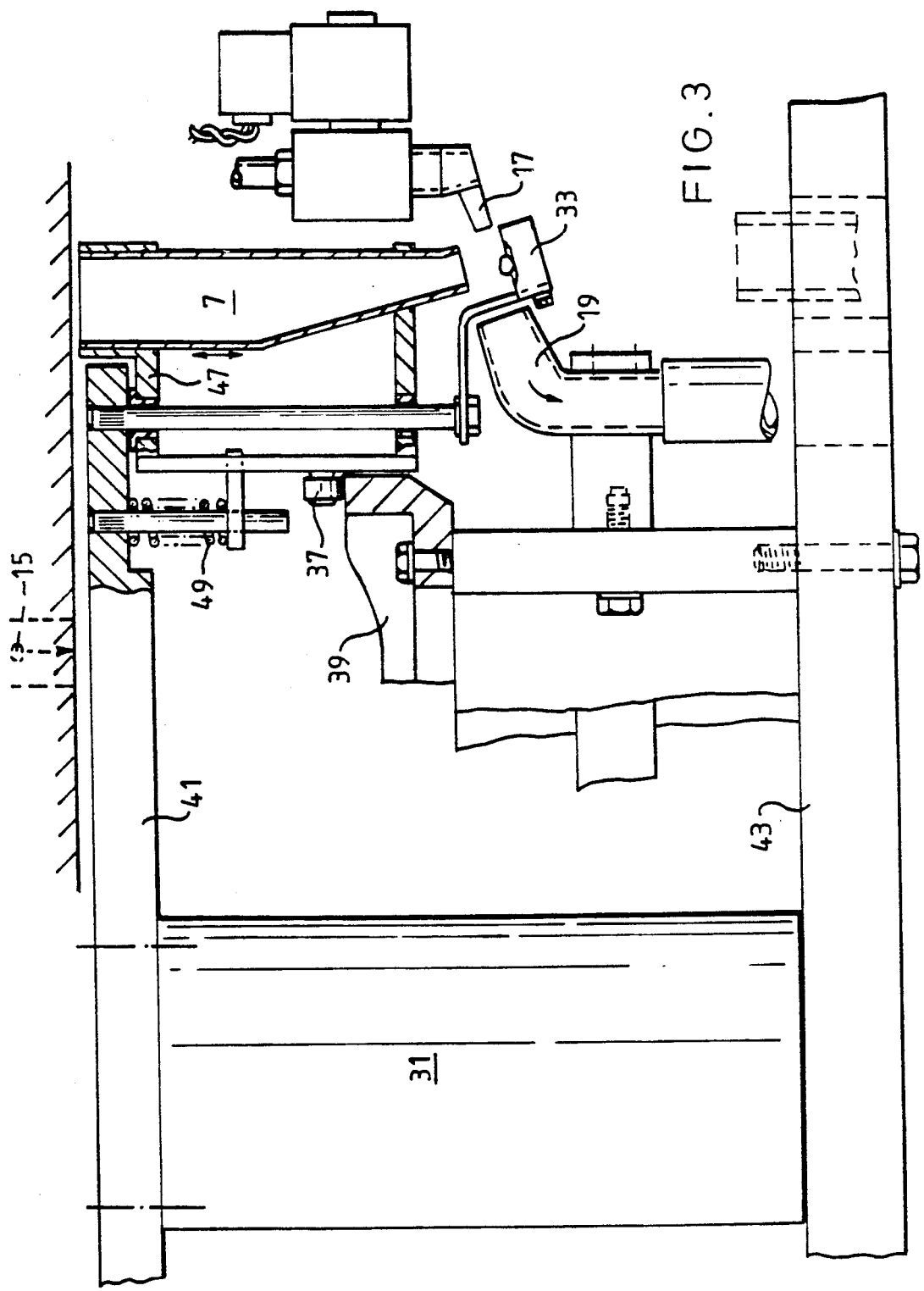

5,305,867

METHOD AND APPARATUS FOR FEEDING ARTICLES

This invention relates to a method and apparatus for feeding articles, and has particular reference to apparatus for feeding individual particles in such a manner that the articles are accurately located in time and space.

BACKGROUND OF THE INVENTION

It is a common practise to sort individual articles sequentially, for example according to their individual weight, colour, clarity etc. This is done for example in the case of diamonds and other stones, sweets, peas, tablets and other medical preparations, and many other articles. When the relevant quality has been measured or detected by appropriate sensing means, the articles must be correspondingly sorted. The sorting may comprise only two categories namely "pass" and "fail", but in many cases it is desirable to sort into a plurality of categories, for example ranges of weight or colour. For accurate sorting, the sorting means must be synchronized with the sensing means, and the articles must be presented to the sorting means with accurate placing and timing to avoid incorrect sorting. The articles may well leave the sensing means with some irregularity in speed, direction, position or timing, and such irregularities need to be reduced or eliminated before the articles are presented to the sorting means.

Ensuring that a sequence of articles is presented with accurately defined timing and placing is also desirable in other contexts, for example in presenting the articles to a sensing means for determining the weight, colour or some other quality.

DISCUSSION OF THE PRIOR ART

Devices for reducing irregularities in the presentation of a sequence of articles have been proposed. GB-A-2201648 describes a feeding device comprising a belt which circulates at a controlled speed and carries a series of uniformly spaced buckets downwards. Articles are inserted one by one in the buckets at the top of the vertical descent and are released at the bottom, so that the buckets define the spacing and velocity of the articles when released.

GB-A-2167197 describes apparatus for weighing a number of objects in succession in which the objects, after being individually weighed, drop into individual rubber pockets of a rotating carousel. These pockets catch and decelerate the objects. The pockets have normally closed but openable bottoms. As the carousel rotates, after a certain degree of rotation the object will have settled in the bottom of its pocket, so that the successive objects are accurately located in time and position by the pockets. The pockets are then opened at predetermined positions corresponding to the previously determined weights of the individual objects so that each object is dispensed into a bin corresponding to the weight of the object. This device can eliminate irregularities in the direction and timing of the objects emerging from the weighing means, and the natural compliance of the rubber used for the pockets substantially eliminates any risk of damage to the objects. However, the speed of the device is inherently limited by the time required for objects to drop under gravity from the pockets into the bins. In practice this may require that the pocket be open for a minimum of about 50 ms, corresponding to a theoretical maximum speed of 20 objects per second. In practice the time required for a mechanism to open and close the pockets reduces the maximum available speed.

Measures can be taken to reduce the delay and increase the speed but such measures are expensive.

SUMMARY OF THE INVENTION

An object of the present invention is to provide feeding apparatus capable of presenting articles in accurately defined sequence at a relatively high rate and with a simple and cheap construction.

According to the present invention, there is provided a feeding apparatus comprising an upper movable carrier comprising a plurality of guides which are transported at a predetermined speed and with a predetermined spacing along a predetermined path, said guides each having an open bottom and each being adapted to receive a respective article individually fed thereto; wherein over a first portion of its path each guide lies immediately above a lower carrier which closes the bottom of and moves in synchronism with the said guide, so as to allow one of the said articles to become located within the said guide by the said carrier for a sufficient period of time as to allow the said article to settle; and wherein over a subsequent portion of the path, the guide and the lower carrier are separated from one another; thereby exposing the article on the lower carrier with accurately defined position and timing.

The guides are, preferably, receptacles.

The articles may then be transferred by the lower carrier for further processing or handling, or they may be removed from the lower carrier, for example by selectively operable removal means controlled in accordance with a previously measured quality of the article for example weight, clarity or colour.

Thus, extracting the articles from the guides does not involve a drop under gravity, but instead, relative movement of the guide and the lower carrier. This can be effected by raising the guide or lowering the lower carrier.

The exposed and stable article can then remain on the carrier for further functions or, more normally, be removed from the carrier by rapid non-gravity methods, e.g. an air jet or a mechanical deflection device.

More specifically, the present invention provides feeding apparatus wherein said guides are arranged in sequence, along a first pre-determined path, said feeding apparatus further comprising at least one feed station comprising means for placing individual articles in respective guides; said lower movable carrier being open upwards and movable along a second predetermined path, said first and second paths being so arranged that the first and second carriers move synchronously and in register with each other at least over a portion of said paths extending between and including said feed station, with said lower carrier closing the open bottoms of said guides at said feed station and retaining said articles in said guides, and means downstream of the feed station for vertically separating said guides from said lower carrier at at least one said position for exposing articles previously placed in said guides and resting on said lower carrier.

In one embodiment a plurality of removal stations is provided downstream of the feed station, and control means adapted to separate the guides from the lower carrier selectively each at a respective selected removal station.

In another embodiment all said guides are separated from said lower carrier at a common position, and means may be provided for selectively removing articles from said lower carrier at a removal station or at selected removal stations while said guides and lower carrier are separated.

Preferably, the apparatus is in the form of a rotating carousel. However this is not essential, further it is not essential that the carriers follow circular paths, nor that their respective paths are congruent.

The lower carrier may be a single body or surface; alternatively separate individual lower carrier elements may be provided for association with respective individual guides.

According to the invention there is also provided a method of handling articles, comprising moving a plurality of successive guides at a predetermined speed and with a predetermined spacing along a predetermined path, each said guide having an open bottom; over a first portion of the said path disposing each guide immediately above a lower carrier which closes the bottom of the guide and moving the carrier in synchronism with the said guide, and feeding said articles to respective guides so that the said articles become located within the said guides, on the said lower carrier, maintaining this relationship between the guide and carrier for a sufficient period of time to allow the said article to settle; and over a subsequent portion of the path, separating the guide and the lower carrier from one another, thereby exposing the articles on the lower carrier with accurately defined position and timing.

The invention also sets out to provide such a method, wherein said articles are placed in respective guides at at least one feed station, the said guides being arranged in sequence along a first predetermined path, said lower moveable carrier being open upwards and moveable along a second predetermined path, said first and second path feeds so arranged that the first and second carriers move synchronously and in register with each other at least over a portion of the said paths extending between and including said feed station, with said lower carrier closing the open bottoms of said guides at said feed station and retaining said articles in said guides, said articles being exposed downstream of the feed station at least one position where said guides are vertically separated from said lower carrier.

BRIEF DESCRIPTION OF THE DRAWINGS

The invention will be further described with reference to the accompanying drawings, in which:

FIG. 3 shows, in more detail, a discharge station of apparatus as shown in FIG. 2.

DESCRIPTION OF THE PREFERRED EMBODIMENTS

Figure 1:
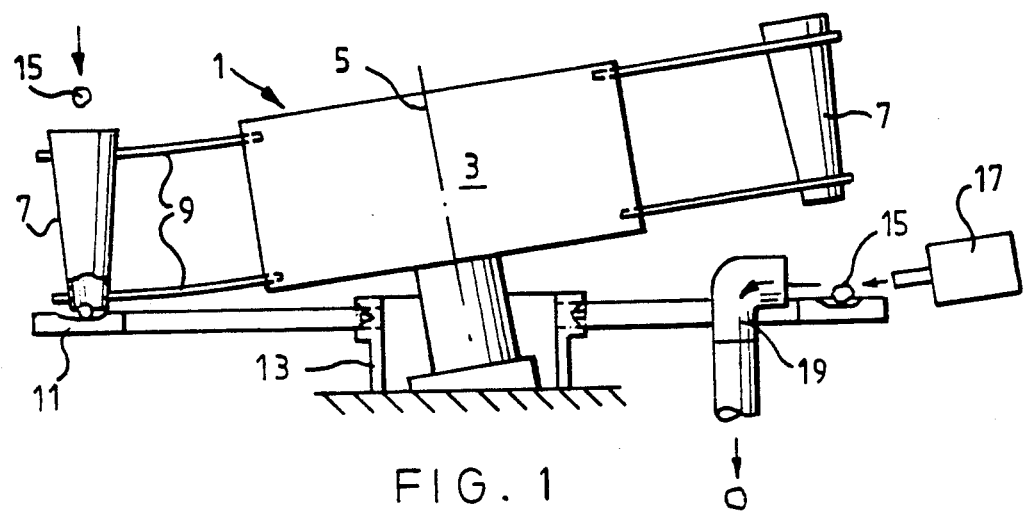
FIG. 1 shows schematically, in diametrical cross section, a first feeding apparatus embodying the invention.

The apparatus shown in FIG. 1 has an upper carousel 1 comprising a hub 3 rotatable about an inclined axis 5, and a multiplicity of flexible pockets or socks 7 mounted on the hub at equal angular intervals and on a common pitch circle coaxial with the hub.

Each pocket 7 is individually mounted on the hub in such a way that it can rise and fall to a limited extent relative to the hub, for example by compliant support ligatures 9. Each pocket is open at the top and bottom, and the bottom is narrower than the top, preferably being not much larger than the expected maximum size of the articles to be handled. The pocket is made of a soft flexible material for example natural or synthetic rubber, to minimise the risk of damage to articles dropped into it.

Below the carousel 1, and essentially concentric with the axis 5, is a rotatable lower carrier in the form of a collecting ring 11 which rotates on a stationary support 13 about a vertical axis and has a radius corresponding to that of the pitch circle of the pockets 7. Accordingly, the collecting ring is directly below the pockets.

The collecting ring rotates at the same angular velocity as the carousel, but is horizontal so that the vertical relationship between the pockets and the collecting ring changes with angular position.

Over a first angular region, typically 90°, comprising the lowest portion of the path of the pockets, the open lower ends of the pockets are in contact with the collecting ring, and are maintained in contact over this angular region by the resilient flexing of the ligatures 9. Consequently, in this angular region the lower ends of the pockets are closed by the collecting ring.

In this angular region, articles 15 being fed enter the open upper ends of the pockets and fall onto the collecting ring as the pockets and ring rotate. The pockets remain in contact with the collecting ring long enough for the articles 15 to settle on the collecting ring, which may be shaped or surfaced in such a manner as to facilitate such settling and minimise damage to the articles. Consequently, the positions of the articles in space and time are positively and accurately defined by the pockets and collecting ring.

As the carousel and collecting ring rotate in unison, and after an angular rotation long enough to enable the articles to settle, the relative tilt of the carousel raises the pockets clear of the collecting ring and the articles resting on it. Consequently the articles on the collecting ring are exposed, over a predetermined further angular region, in positions accurately defined spacially and temporally. In this region, the articles can be removed from the collecting ring. Typically, the angular region over which the pockets and collecting ring are sufficiently separated for the articles to be removed, is about 90°.

The articles can be removed selectively according to predetermined criteria, for example in dependence on the result of a measuring operation performed before the articles are fed into the pockets.

By way of example only, FIG. 1 shows one of a plurality of pulsed air jets 17, controlled by a measuring apparatus upstream of the carousel and directed to blow selected articles from the collecting ring into a corresponding dispensing chute 19. It will be understood that the apparatus will in general comprise a multiplicity of air jets at angular intervals, each paired with a respective dispensing chute 19 leading to a corresponding outlet or bin, so that by selective operation of the air jets in timed relation to the operation of the measuring apparatus, the articles 15 can be directed into respective bins according to their previously measured qualities.

It will be seen that irregularities in the position or timing of the articles fed into the pockets are effectively eliminated before the articles are presented on the collecting ring to the air jets, so that the articles can be reliably sorted by operation of the air jets in timed relation with the apparatus used for measuring the articles.

The design of the apparatus minimises the risk of damage to the articles, and furthermore is very simple and robust. The rate of operation is limited only by the time required for articles to settle on the collecting ring. The removal of the articles from the collecting ring can be very rapid. However, the number of individual removal or dispensing stations is limited to the region in which the tilt of the carousel provides adequate clearance between the pockets and the collecting ring.

Although the described embodiment has a horizontal collecting ring and a tilted carousel, it is possible to employ a horizontal carousel and a tilted collecting ring, or indeed, to have both of these elements tilted. In the described embodiment the pockets and the lower carrier follow circular paths, however this is not essential and the respective paths may, at least in the entry and settling region where they coincide, be rectilinear, suitable guide means being provided for raising the pockets or lowering the lower carrier to produce the necessary clearance for discharge of the articles.

A further advantage of the described device is that the articles are effectively confined after entering the pockets and while they settle on the collecting ring, so that their final position cannot be disturbed by bouncing on the collecting ring and there is no risk that the articles will be lost by bouncing out.

Figure 2:
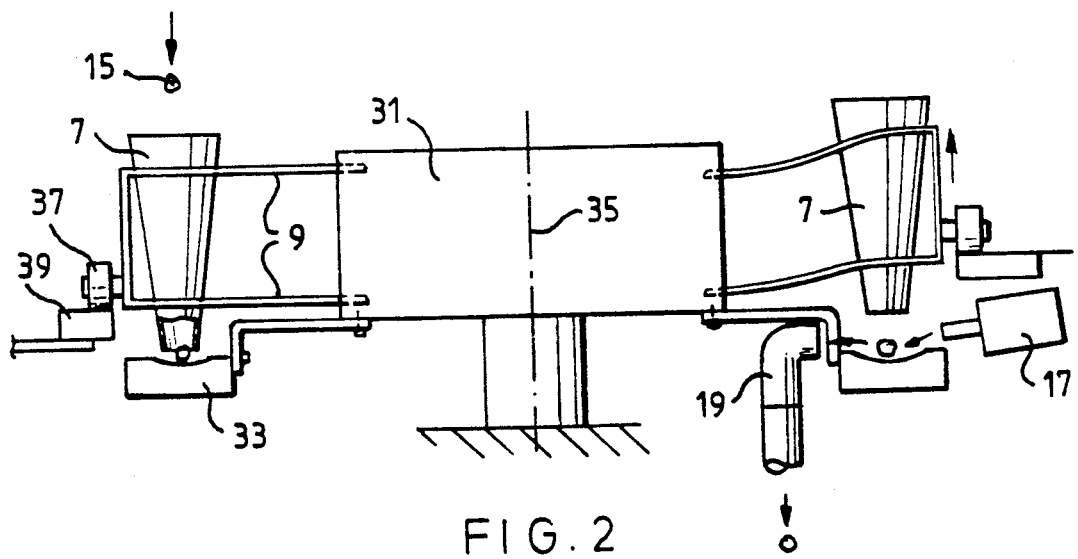
FIG. 2 is a similar view of a second feeding apparatus embodying the invention.

FIGS. 2 and 3 show an alternative construction which enables the number of individual dispensing stations to be increased.

In the apparatus shown in FIGS. 2 and 3 a single hub 31 carries the pockets 7 through resilient ligatures 9, and also carries a coaxial collecting ring 33 below the pockets, the whole being rotatable about a vertical axis 35.

The vertical positions of the pockets 7 relative to the collecting ring 33 are controlled by individual cam followers 37 connected to each of the pockets, these cam followers running on a static cam track 39 coaxial with the carousel.

Because the pockets are positively raised and lowered by the cam followers and cam track, the region of transition between the region in which the pockets are in contact with the collecting ring and the region in which they are raised clear of the ring for dispensing of the articles, can be made much shorter than in the apparatus shown in FIG. 1. Consequently, the angular region available for the installation of dispensing stations (illustrated by an air jet and dispensing chute as in FIG. 1) can be substantially increased.

Typically, the diameter of the upper end of a sock may be about 25 mm. The carousel may for example have 48 pockets at 190 mm radius and would be capable of handling, in the case of diamonds, 30 stones per second entering the carousel at 2 meters per second and with an error on entry position of 8 mm from the true axis with stones up to 9 mm diameter.

In the described embodiment, individual pockets are lifted away from the collecting ring to expose the articles. Alternatively, the articles may be exposed by lowering individual segments of the collecting ring below the respective pockets. The latter construction however somewhat increases the risk that the action of exposing the articles will disturb the articles.

FIG. 3 shows by way of example only, construction details of a feeding apparatus generally as shown in FIG. 2 but with a modified mounting of the pockets.

In this apparatus, the carousel comprises a top plate 41 mounted on the hub, above a static bottom plate 43 which carries the cam track 39 and chute 19.

The collecting ring 33 is suspended from the top plate by vertical rods 45. These rods also serve as vertical guides for individual frames 47 each of which carries the upper end of a respective pocket and guides but does not positively hold the lower end of the same pocket.

Each frame 47 is urged downwards by a respective compression spring 49 urging the cam follower 37 into contact with the cam track 39. As the cam follower encounters a raised region of the cam track, it is raised and in turn raises the pocket bodily away from the collecting ring 33 long enough for the air jet 17 to blow the article into the chute 19.

In the described embodiments, receptacles, in the form of pockets, have been used as the guides for the articles. Alternatively the guides could be in the form of a plurality of upright rods, for example.

In the described embodiments, the pockets have been raised and lowered bodily relative to the collecting ring. Alternatively, only the lower end portion of the pocket may be lowered and raised to locate and expose the article respectively.

I claim:

1. A feeding apparatus comprising an upper movable carrier comprising a plurality of guides which in operation are transported at a predetermined speed and with a predetermined spacing along a predetermined path, said guides each having an open bottom and each being adapted to receive a respective article individually fed thereto; wherein over a first portion of its path each guide lies immediately above a lower carrier which closes the bottom of and moves in synchronism with the said guide, so as to allow one of the said articles to become located within the said guide by the said lower carrier for a sufficient period of time to allow the said article to settle; and wherein over a subsequent portion of the path, the guide and the lower carrier are separated from one another, thereby exposing the article on the lower carrier with accurately defined position and timing.

2. A feeding apparatus according to claim 1, wherein said guides are arranged in sequence, along a first predetermined path, said feeding apparatus further comprising at least one feed station comprising means for placing individual articles in respective guides; said lower movable carrier being open upwards and movable along a second predetermined path, said first and second paths being so arranged that the first and second carriers move synchronously and in register with each other at least over a portion of said paths extending between and including said feed station, with said lower carrier closing the open bottoms of said guides at said feed station and retaining said articles in said guides, and means downstream of the feed station for vertically separating said guides from said lower carrier at at least one said position for exposing articles previously placed in said guides and resting on said lower carrier.

3. A feeding apparatus according to claim 2, comprising a plurality of removal stations provided downstream of the feed station, and control means adapted to separate the guides from the lower carrier selectively each at a respective selected removal station.

4. A feeding apparatus according to claim 1, further comprising selectively operable removal means for removing the said exposed articles from the said lower carrier.

5. A feeding apparatus according to claim 1, wherein said guides are separated from said lower carrier at a common position, and removal means are provided for selectively removing articles from said lower carrier at a removal station or at selected removal stations while the said guides and lower carrier are separated.

6. A feeding apparatus according to claim 4, wherein the said removal means is one or more air jets.

7. A feeding apparatus according to claim 4, wherein the said removal means is mechanical deflection means.

8. A feeding apparatus according to claim 1, wherein the said lower carrier rotates about an upright axis.

9. A feeding apparatus according to claim 8, wherein the said guides are arranged upon a said upper carrier which rotates about an axis which is generally concentric with the axis of the lower carrier, but wherein the axis of the upper carrier is inclined with respect to the axis of the said lower carrier, the arrangement being such that the lower carrier rotates at the same angular velocity as the upper carrier and in such a manner that the distance between a portion of each respective guide and the collecting ring changes with angular position.

10. A feeding apparatus according to claim 9, wherein the axis of the said lower carrier is substantially vertical.

11. A feeding apparatus according to claim 8, wherein the said guides are arranged upon an upper carrier which rotates coaxially with the said lower carrier at the same angular velocity as the lower carrier.

12. A feeding apparatus according to claim 9, further comprising a hub, each of the said guides being connected to the hub by means of a deflectable member and at least a portion of the respective guide being urged towards the lower carrier, the deflectable members together defining the upper carrier.

13. A feeding apparatus according to claim 12, wherein each said deflectable member is a flexible ligature.

14. A feeding apparatus according to claim 11, wherein the said upper carrier and the said lower carrier are both connected to a hub, the said feeding apparatus further comprising a plate mounted upon the said hub; a plurality of suspension rods, each said suspension rod depending from the said plate; a plurality of frame portions, each said frame portion supporting a portion of a respective one of the said guides and being slideably mounted upon a respective one of the said suspension rods; and a plurality of compression springs, each compression spring serving to urge a respective one of the said frame portions towards the said lower carrier; the plate the suspension rods, and the frame portions together defining the upper carrier.

15. A feeding apparatus according to claim 11 further comprising a cam, having a fixed position in relation to the angular movement of the said carriers, and a plurality of cam followers, one cam follower being connected to each guide, the arrangement being such that the cam causes each cam follower which comes into contact therewith to move as the carriers rotate, thereby causing movement of at least a portion of the guide connected to each respective cam follower which contacts said cam towards or away from the lower carrier.

16. A feeding apparatus according to claim 15, comprising a plurality of cams disposed upon a static anular cam track arranged coaxially with the said upper carrier and the said lower carrier.

17. A feeding apparatus according to claim 8, wherein individual segments of the said lower carrier are mounted to be lowered away from one or more of the said guides.

18. A feeding apparatus according to claim 9 wherein, during movement towards and away from the lower carrier, each said respective guide moves bodily.

19. A feeding apparatus according to claim 1, wherein the said guides are receptacles.

20. A method of handling articles, comprising moving a plurality of successive guides at a predetermined speed and with a predetermined spacing along a predetermined path, each said guide having an open bottom; over a first portion of the said path disposing each guide immediately above a lower carrier which closes the bottom of the guide and moving the carrier in synchronism with the said guide, and feeding said articles to respective guides so that the said articles become located within the said guides, on the said lower carrier, maintaining this relationship between the guide and carrier for a sufficient period of time to allow the said article to settle; and over a subsequent portion of the path, separating the guide and the lower carrier from one another, thereby exposing the articles on the lower carrier with accurately defined position and timing.

21. A method according to claim 20, wherein said articles are placed in respective guides at at least one feed station, the said guides being arranged in sequence along a first predetermined path, said lower moveable carrier being open upwards and moveable along a second predetermined path, said first and second path feeds so arranged that the first and second carriers move synchronously and in register with each other at least over a portion of the said paths extending between and including said feed station, with said lower carrier closing the open bottoms of said guides at said feed station and retaining said articles in said guides, said articles being exposed downstream of the feed station at at least one position where said guides are vertically separated from said lower carrier.

22. A feeding apparatus according to claim 21 comprising removing exposed articles from said lower carrier by means of selectively operable removal means.

* * * * *